No. 719,896. PATENTED FEB. 3, 1903.
F. C. SPANG.
CANDY DIPPER.
APPLICATION FILED JULY 29, 1902.
NO MODEL.

WITNESSES:
Paul Hunter
C. R. Ferguson

INVENTOR
Fred C. Spang
BY
Munn
ATTORNEYS.

UNITED STATES PATENT OFFICE.

FRED C. SPANG, OF LA CROSSE, WISCONSIN.

CANDY-DIPPER.

SPECIFICATION forming part of Letters Patent No. 719,896, dated February 3, 1903.

Application filed July 29, 1902. Serial No. 117,557. (No model.)

*To all whom it may concern:*

Be it known that I, FRED C. SPANG, a citizen of the United States, and a resident of La Crosse, in the county of La Crosse and State of Wisconsin, have invented certain new and useful Improvements in Candy-Dippers, of which the following is a full, clear, and exact description.

This invention relates to improvements in devices for dipping candy in chocolate or other coating material, the object being to provide a dipper of simple construction by means of which candies may be rapidly dipped and uniformly coated.

I will describe a candy-dipper embodying my invention and then point out the novel features in the appended claims.

Reference is to be had to the accompanying drawings, forming a part of this specification, in which similar characters of reference indicate corresponding parts in both the figures.

Figure 1:
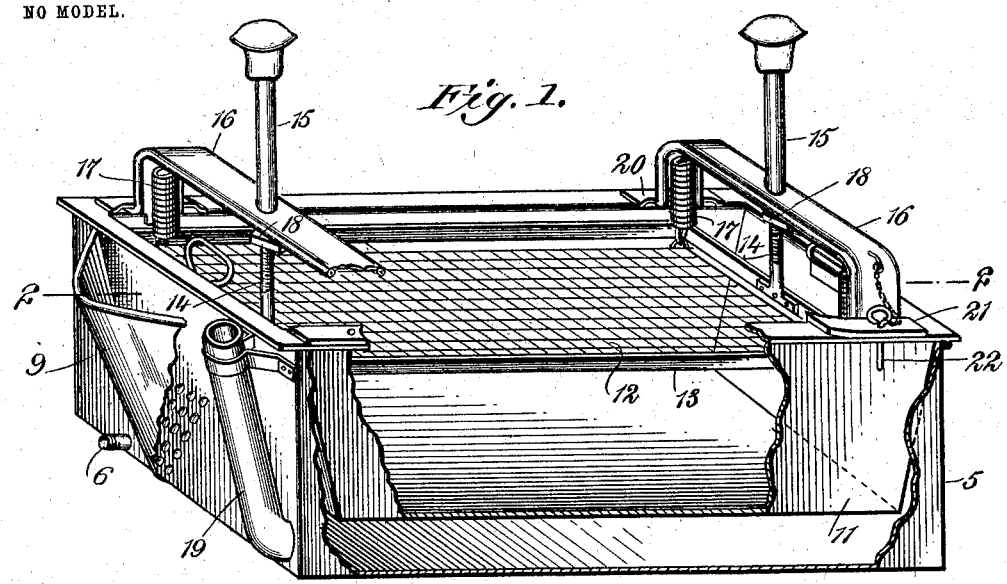
Figure 2:
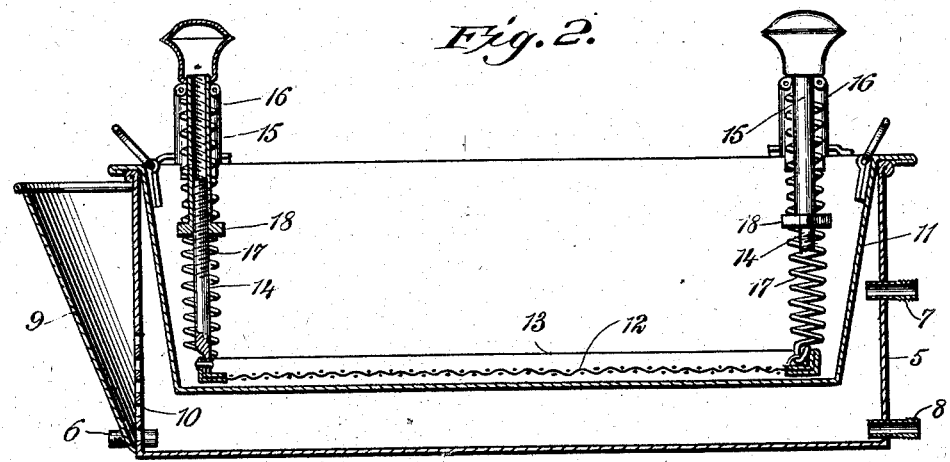

Figure 1 is a perspective view, partly in section, of a candy-dipper embodying my invention; and Fig. 2 is a section on the line 2 2 of Fig. 1.

The dipper comprises a pan 5 for a heating medium—such, for instance, as hot water or steam—and it is provided at one end with an inlet-tube 6 for steam and at the other end with outlets 7 8 for water or condensed steam. It is also provided at one end with a spout 9, through which water may be poured to enter the pan 5 through the openings 10.

Removably placed in the pan 5 is a holder 11 for the coating material. Movable in the holder 11 is a carrier 12 for the candy to be coated. This carrier is made in the form of a screen mounted in a frame 13. From the frame 13 push-rods consisting of sections 14 15 extend upward through yokes 16, removably attached to the top flange of the holder 11. Also connecting the frame with the yokes 16 are springs 17. The push-rods are made in two sections 14 and 15, as shown—that is, one section 14, having an exterior thread, and the section 15, which is tubular, having an interior thread, so that by adjusting the length of the push-rods the tension of the springs may be regulated or the depth of movement of the carrier 12 may be adjusted. The upward movement of the carrier is limited by means of collars 18 on the lower ends of the push-rod sections 15.

On one end of the pan 5 is a tube 19, which communicates with the interior of the pan and is designed to hold a thermometer for indicating the degree of heat.

In operation the coating material is placed in the holder 11, and hot water or steam is employed in the pan 5. The candy to be coated is to be placed on the carrier 12 and then forced down into the coating material. Upon releasing the handles of the push-rods the springs will cause the carrier to move quickly upward, so that the collars 18 by striking against the yokes 16 will cause a jar and remove all superfluous coating material.

The yokes 16 are removably attached to the holder 11. As here shown, the yokes at one end are passed underneath loops 20, attached to the flange of the holder, and the opposite ends are slid underneath keepers 21, which are open at the end, and locking-pins 22 are passed through said keepers and through openings in the ends of the yokes.

Having thus described my invention, I claim as new and desire to secure by Letters Patent—

1. A candy-dipper, comprising a coating-holder, and a spring-held carrier movable in the holder, substantially as specified.

2. A candy-dipper comprising a pan for a heating medium, a holder for a coating material, yokes attached to said coating-holder, a carrier consisting of a screen, a spring connection between said carrier and the yokes, and push-rods extended from the carrier through openings in the yokes, substantially as specified.

3. A candy-dipper comprising a pan for a heating medium, a holder for coating material, yokes on said holder for coating material, a carrier consisting of screen material, spring connection between said carrier and the yokes, and adjustable push-rods extended from the carrier through openings in the yokes, substantially as specified.

4. A candy-dipper comprising a pan for a heating medium, a holder for coating material removably placed in said pan, a carrier consisting of screen material, yokes removably attached to the holder for coating material, spring connections between said yokes and the carrier, and push-rods consisting of sections having screw-thread connection, the said push-rods having their lower ends connected to the carrier and the upper ends passing through openings in the yokes, and collars on the push-rods below the yokes, substantially as specified.

5. A candy-dipper comprising a pan for a heating medium, the said pan having an inlet and an outlet for the heating medium, a pouring-spout on one end of said pan, a holder for coating material, and a spring-held carrier of screen material movable in the holder for coating material, substantially as specified.

In testimony whereof I have signed my name to this specification in the presence of two subscribing witnesses.

FRED C. SPANG.

Witnesses:
E. J. TIEDEMANN,
O. L. WOODWARD.